United States Patent
Frost

(10) Patent No.: US 9,937,998 B2
(45) Date of Patent: Apr. 10, 2018

(54) METHOD FOR MANUFACTURING A NACELLE STRAKE

(71) Applicant: Rohr, Inc., Chula Vista, CA (US)

(72) Inventor: Juddson Frost, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 388 days.

(21) Appl. No.: 14/626,694

(22) Filed: Feb. 19, 2015

(65) Prior Publication Data

US 2016/0243806 A1    Aug. 25, 2016

(51) Int. Cl.
*B64C 5/06* (2006.01)
*B29C 53/38* (2006.01)
*B64F 5/10* (2017.01)

(52) U.S. Cl.
CPC ............... *B64C 5/06* (2013.01); *B29C 53/38* (2013.01); *B64F 5/10* (2017.01)

(58) Field of Classification Search
None
See application file for complete search history.

(56) References Cited

U.S. PATENT DOCUMENTS

| | | |
|---|---|---|
| 3,744,745 A | 7/1973 | Kerker et al. |
| 3,960,345 A | 6/1976 | Lippert, Jr. |
| 4,054,481 A | 10/1977 | Heffner |
| 4,540,143 A | 9/1985 | Wang et al. |
| 4,917,333 A | 4/1990 | Murri |
| 5,230,213 A | 7/1993 | Lawson |
| 5,249,762 A | 10/1993 | Skow |
| 5,275,360 A | 1/1994 | Porter et al. |
| 5,366,180 A | 11/1994 | Wainfan et al. |
| 5,653,406 A | 8/1997 | Amano et al. |
| 5,961,068 A | 10/1999 | Wainfan et al. |
| 6,513,754 B1 | 2/2003 | Grove |
| 6,964,397 B2 | 11/2005 | Konings |
| 7,255,387 B2 | 8/2007 | Wood |
| 7,475,848 B2 | 1/2009 | Morgenstern et al. |
| 8,087,617 B2 | 1/2012 | Sclafani et al. |
| 8,181,912 B2 | 5/2012 | Schwetzler |
| 8,545,659 B2 * | 10/2013 | Lengsfeld ............ B29C 70/462 156/226 |
| 8,568,551 B2 | 10/2013 | Brennan et al. |
| 8,628,040 B2 | 1/2014 | Moore et al. |
| 8,985,503 B2 | 3/2015 | Desroche |
| 2007/0039284 A1* | 2/2007 | Munoz Royo .......... B64C 1/064 52/847 |
| 2014/0110633 A1* | 4/2014 | Pratte .................. B32B 38/0008 252/500 |
| 2014/0209744 A1* | 7/2014 | Marcoe .................. B64C 3/185 244/123.1 |

* cited by examiner

*Primary Examiner* — Barbara J Musser
(74) *Attorney, Agent, or Firm* — O'Shea Getz P.C.

(57) ABSTRACT

A method for manufacturing a strake is provided. The method includes: providing a first thermoplastic laminate panel; providing a second thermoplastic laminate panel; attaching the first thermoplastic laminate panel to the second thermoplastic laminate panel such that at least a portion of the attachment surface of the first thermoplastic laminate panel is attached to the attachment surface of a portion of the second thermoplastic laminate panel, which attached portions form a body of the strake; forming a first flange from a portion of the first thermoplastic laminate panel; and forming a second flange from a portion of the second thermoplastic laminate panel.

16 Claims, 6 Drawing Sheets

METHOD FOR MANUFACTURING A NACELLE STRAKE

BACKGROUND OF THE INVENTION

1. Technical Field

The present disclosure relates to aerodynamic structures for use with aircraft in general, and to methods for manufacturing such aerodynamic structures in particular.

2. Background Information

On certain aircraft such as commercial airliners, tankers, airlifters and transport aircraft, aircraft engines are typically mounted in nacelles that extend from pylons under the wing. In many aircraft, the leading edge of the engine nacelle is positioned forward of the wing leading edge. At high angles of attack, the engine nacelle sheds a wake. For aircraft where the engine nacelles are mounted in close proximity to the wing, the nacelle wake may flow over the wing leading edge and along the upper wing surface. Although the nacelle wake can be aerodynamically favorable under certain flight conditions, at high angles of attack close to the stalling angle where maximum lift is typically achieved, the nacelle wake can cause flow separation along the upper surface of the wing. Such flow separation may result in a reduction in the amount of lift that is producible by the wing in comparison to what might be achievable absent the nacelle wake.

Aircraft manufacturers have addressed the above-described flow separation phenomenon by installing various vortex-generating devices such as strakes (sometimes referred to as "chines") on the outer surface of the engine nacelle. The strake is typically mounted on a side of the engine nacelle and is sized and positioned to control the separation of the nacelle wake by generating a vortex that interacts beneficially with the wing upper surface boundary layer in order to reduce flow separation.

Historically, strakes have been manufactured from metal (e.g. aluminum) and from thermoset polymer laminates. Strakes manufactured from such materials can be challenging to manufacture and are often relatively expensive. It would be desirable to provide a strake and method of manufacture that facilitates the manufacture and decreases the cost of the strake.

SUMMARY OF THE INVENTION

According to an aspect of the present disclosure, a method for manufacturing a strake is provided. The method includes the steps of: providing a first thermoplastic laminate panel, having a thickness extending between an exterior surface and an attachment surface; providing a second thermoplastic laminate panel, having a thickness extending between an exterior surface and an attachment surface; attaching the first thermoplastic laminate panel to the second thermoplastic laminate panel such that at least a portion of the attachment surface of the first thermoplastic laminate panel is attached to the attachment surface of a portion of the second thermoplastic laminate panel, which attached portions form a body of the strake; forming a first flange from a portion of the first thermoplastic laminate panel; and foaming a second flange from a portion of the second thermoplastic laminate panel.

In a further embodiment of the foregoing aspect, the first flange is formed prior to attaching the first thermoplastic laminate panel to the second thermoplastic laminate panel.

In a further embodiment of any foregoing embodiment or aspect of the present disclosure, forming the first flange includes heating a region of the first thermoplastic laminate panel to a first temperature at which the first thermoplastic laminate panel can be plastically deformed, bending the first thermoplastic laminate panel within the heated region, and subsequently cooling the region to a second temperature below the first temperature.

In a further embodiment of any foregoing embodiment or aspect of the present disclosure, the second flange may be formed prior to attaching the first thermoplastic laminate panel to the second thermoplastic laminate panel.

In a further embodiment of any foregoing embodiment or aspect of the present disclosure, forming the second flange includes heating a region of the second thermoplastic laminate panel to a first temperature at which the second thermoplastic laminate panel can be plastically deformed, bending the second thermoplastic laminate panel within the heated region, and subsequently cooling the region to a second temperature below the first temperature.

In a further embodiment of any foregoing embodiment or aspect of the present disclosure, attaching the first thermoplastic laminate panel to the second thermoplastic panel includes heating the first thermoplastic laminate panel and the second thermoplastic laminate panel to a predetermined temperature.

In a further embodiment of any foregoing embodiment or aspect of the present disclosure, at least one of the first thermoplastic laminate panel and the second thermoplastic laminate panel comprises a polyaryletherketone type thermoplastic polymer.

In a further embodiment of any foregoing embodiment or aspect of the present disclosure, at least one of the first thermoplastic laminate panel and the second thermoplastic laminate panel comprises a fiber reinforcement material.

In a further embodiment of any foregoing embodiment or aspect of the present disclosure, the method includes disposing a delamination ply between a flange portion of the first thermoplastic laminate panel and a flange portion of the second thermoplastic laminate panel prior to attaching the first thermoplastic laminate panel and the second thermoplastic laminate panel together.

In a further embodiment of any foregoing embodiment or aspect of the present disclosure, the delamination ply resides between the flange portions of the first thermoplastic laminate panel and the second thermoplastic laminate panel during attachment of the first thermoplastic laminate panel and the second thermoplastic laminate panel.

In a further embodiment of any foregoing embodiment or aspect of the present disclosure, the method includes disposing the body of the strake within a first forming tool, heating a region of the flange portion of the first thermoplastic laminate panel to a first temperature at which the first thermoplastic laminate panel can be plastically deformed, bending the first thermoplastic laminate panel within the heated region, and subsequently cooling the region to a second temperature below the first temperature.

In a further embodiment of any foregoing embodiment or aspect of the present disclosure, at least one of the first forming tool and the second forming tool is moved toward the other forming tool to cause the bending of the first thermoplastic laminate panel within the heated region.

In a further embodiment of any foregoing embodiment or aspect of the present disclosure, the method further includes heating a region of the flange portion of the second thermoplastic laminate panel to the first temperature, bending the second thermoplastic laminate panel within the heated region, and subsequently cooling the region to the second temperature.

In a further embodiment of any foregoing embodiment or aspect of the present disclosure, at least one of the first forming tool and the second forming tool is moved toward the other forming tool to cause the bending of the second thermoplastic laminate panel within the heated region.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
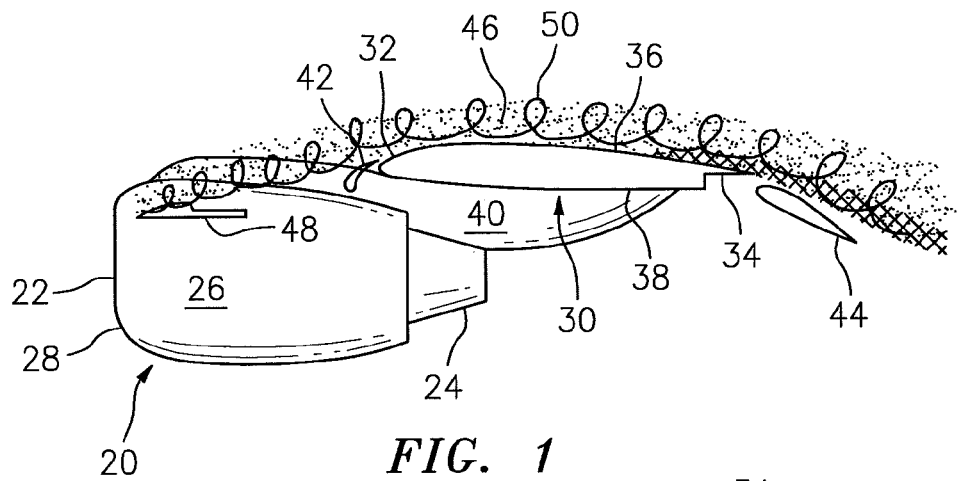
FIG. 1 is a diagrammatic side view of a gas turbine engine and nacelle attached to an aircraft wing, illustrating air flow characteristics.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. In addition, the steps/operations described below with respect to the illustrated method(s) are illustrative. In some embodiments, one or more steps of a first method may be combined with one or more steps of one or more additional methods. In some embodiments, one or more of the steps may be optional. In some embodiments, the steps may execute in an order or sequence that is different from what is shown. In some embodiments, additional steps not shown may be included.

Figure 2:
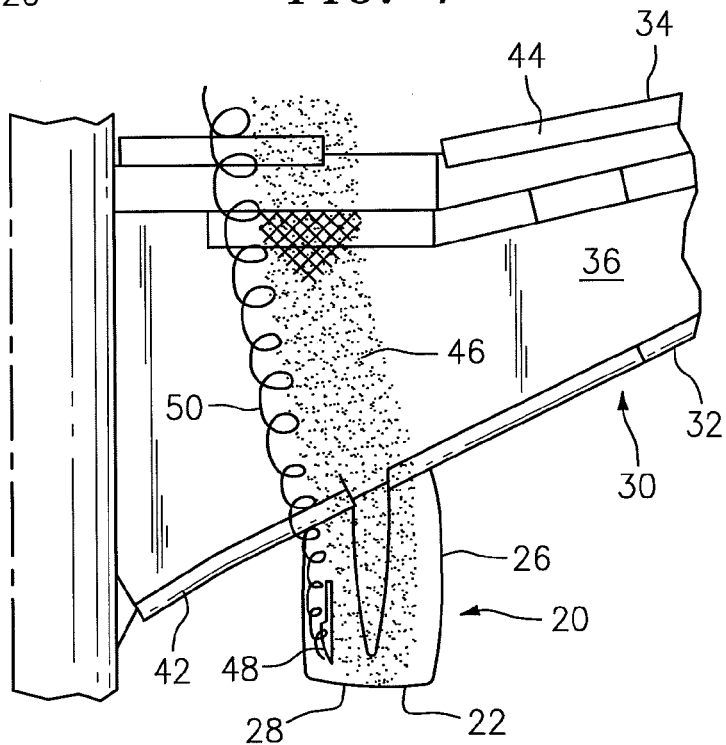
FIG. 2 is a diagrammatic top view of the gas turbine engine and nacelle attached to an aircraft wing shown in FIG. 1, illustrating air flow characteristics.
Figure 3:
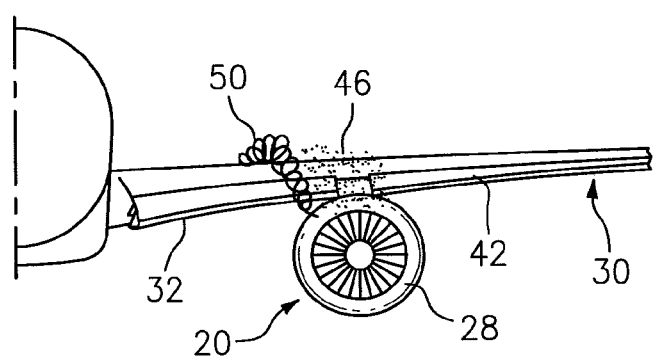
FIG. 3 is a diagrammatic front view of the gas turbine engine and nacelle attached to an aircraft wing shown in FIG. 1, illustrating air flow characteristics.

In FIGS. 1-3, there is shown a nacelle/wing assembly which is typical for many aircraft. The nacelle 20 is or may be of conventional design, and it comprises an inlet end 22, an exhaust end 24 and a side wall 26 providing an exterior circumferential side surface extending from the inlet to the exhaust end 24. At the inlet end 22, there is a circumferential inlet edge 28 which defines the inlet itself, designated.

The wing 30 has a leading edge 32, a trailing edge 34, an upper surface 36, and a lower surface 38. The nacelle 20 is mounted by a pylon 40 to the lower side of the wing 20, in a manner that the major part of the nacelle 20 is forward of the wing leading edge 32. The wing 30 has leading edge devices 42 and trailing edge devices 44 which have a stowed configuration for cruise mode, but which are extended for a high lift mode of operation such as during takeoff and landing.

When the wing 30 is disposed at high angles of attack, flow may separate from the upper portion of the inlet edge 28 and a highly turbulent wake 46 may be formed and consequent undesirable flow separation. The wake 46 may reduce lift which could otherwise be achieved. To reduce the wake 46, it is known to attach one or more strakes 48 on an exterior surface of the nacelle 20. The strake 48 sheds a strong vortex 50 that passes over the leading edge 32 of the wing 30 in a manner that reduces the span of the wake 46. By reducing the span of the wake 46, the flow separation on the wing 30 due to the nacelle wake/wing boundary layer interaction is reduced. The reduced separation results in increased lift at a given angle of attack and a delayed stall.

Figure 4:
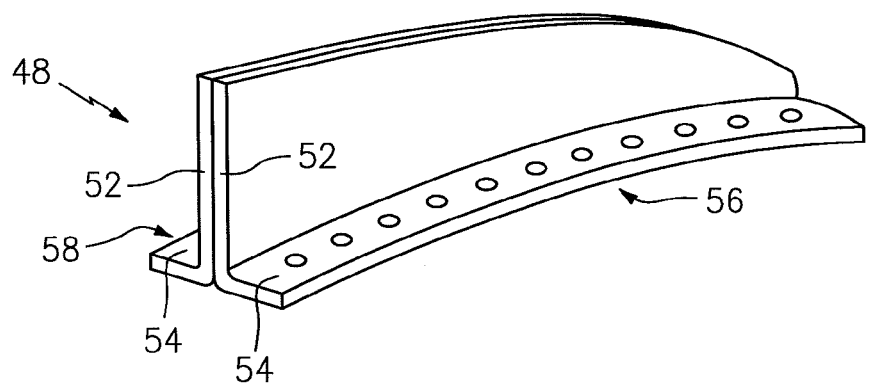
FIG. 4 is a diagrammatic perspective view of a strake according to an aspect of the present disclosure.
Figure 5:
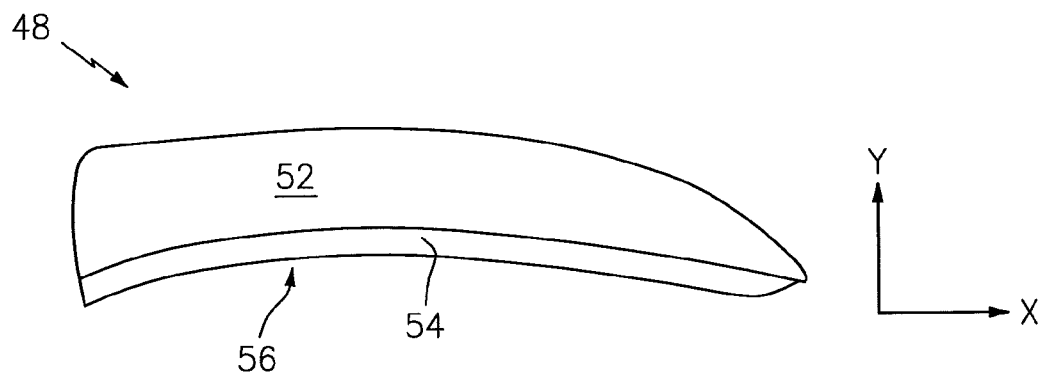
FIG. 5 is a diagrammatic side view of a strake according to an aspect of the present disclosure.
Figure 6:
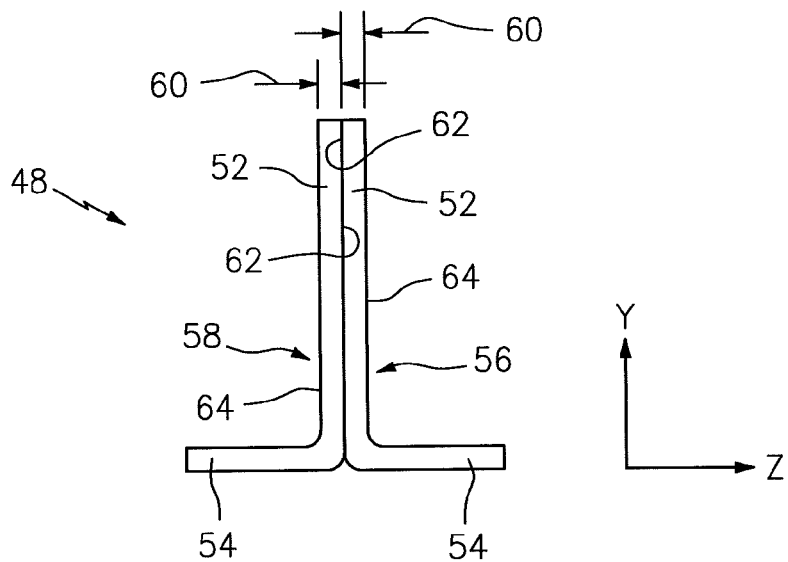
FIG. 6 is a diagrammatic end view of a strake according to an aspect of the present disclosure.

Now referring to FIGS. 4-6, the strake 48 may be described as having a body 52 and at least one flange 54 extending outwardly from the body 52. The strake 48 may further be described as having a length (shown extending along the "X" axis), a height (shown extending along the "Y" axis), and a width (shown extending along the "Z" axis). The strake 48 may be configured with a geometry that satisfies the particular application in which the strake 48 is deployed; e.g. the contour of the surface to which the strake 48 is attached, the height of the strake 48 (i.e. the distance the strake 48 extends outwardly from the surface to which it is attached), and the length of the strake 48. As will be described below, the present disclosure can be used to manufacture a plurality of differently configured strakes 48, and the present disclosure is, therefore not limited to any particular strake 48 configuration.

According to an aspect of the present disclosure, a method for manufacturing a strake 48 is provided. The strake 48 includes a reinforced thermoplastic polymer laminate. The laminate may include a polymer such as a polyaryletherketone type thermoplastic polymer. Specific non-limiting examples of polyaryletherketone type thermoplastic polymer include polyether ether ketone ("PEEK") and polyether ketone ketone ("PEKK"). In another example, the laminate may include a polymer such as a polyethermide ("PEI") thermoplastic polymer. In some embodiments, the laminate includes fiber reinforcement. Carbon fibers and fiberglass are non-limiting examples of an acceptable fiber reinforcement material. The carbon fibers and/or the fiberglass may be in the form of continuous or discontinuous fiber. In some preferred embodiments, the fiber reinforcement material includes continuous fiber strands. The continuous fiber reinforcement material can be oriented within the strake 48 to provide enhanced mechanical strength properties. For example, the reinforcement fibers may be oriented to modify strength and stiffness properties either locally or in the overall structure.

Figure 13:
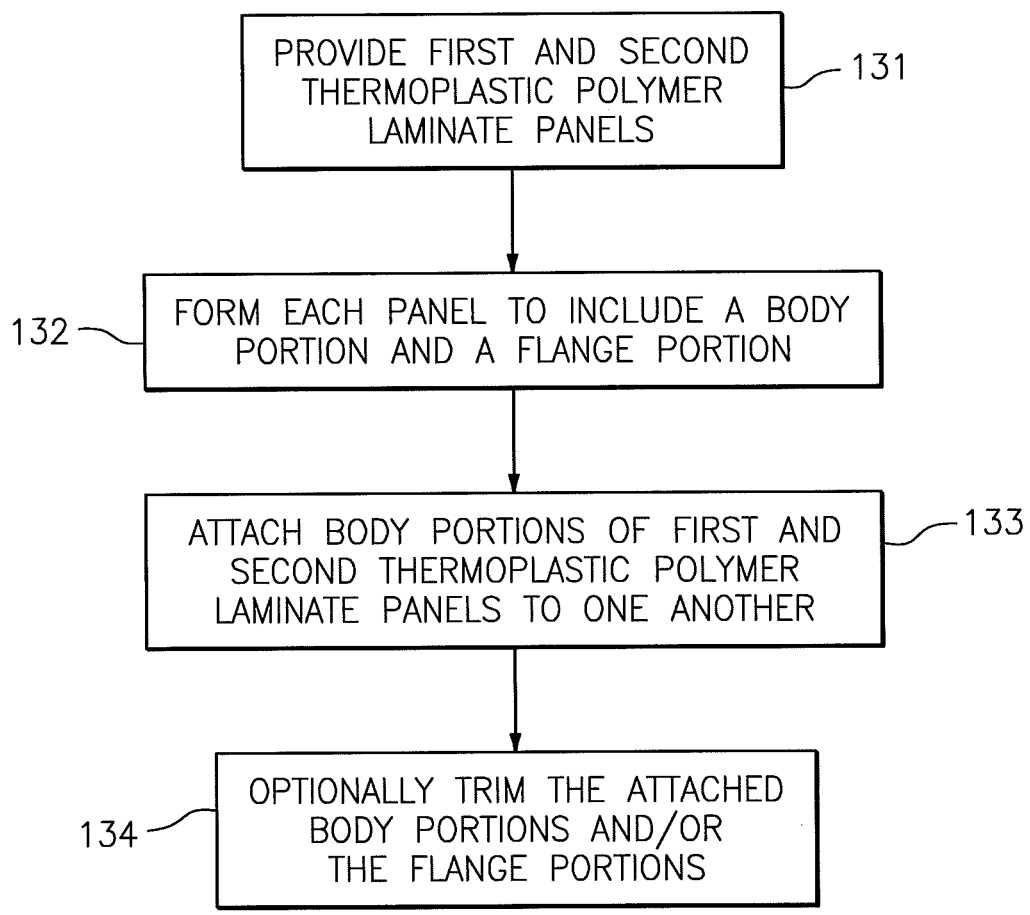
FIG. 13 is a flow chart of a strake manufacturing embodiment according to the present disclosure.

Now referring to FIGS. 4-6 and 13, according to one aspect of the present disclosure the method for manufacturing a strake 48 includes providing a first reinforced thermoplastic polymer laminate panel ("first panel 56") and a second reinforced thermoplastic polymer panel ("second panel 58"; see step 131 in FIG. 13). The first panel 56 and second panel 58 may each be described as having a thickness 60 that extends between an attachment surface 62 and an exterior surface 64. The first and second panels 56, 58 may be configured identically or made be configured differently from one another. The first panel 56 is formed to include a flange 54 portion and a body 52 portion (step 132 in FIG. 13). The formation process may include heating at least a region of the first panel 56 to a temperature at which the laminate is in a bendable state (e.g. above the glass transition temperature). Subsequently, the first panel 56 may be bent along a bend axis to achieve a desired configuration; e.g. to form the flange 54 portion and the body 52 portion separated from one another along the bend axis. In the strake 48 embodiment shown in FIG. 6, the flange 54 is deflected away from the body 52 portion so that the flange 54 extends outwardly from the body 52 portion; e.g. in FIG. 6 the flange 54 of each panel 56, 58 is shown extending along a line perpendicular to the body portion (an "L" shape). The flange 54 may be oriented relative to the body 52 portion in a variety of different configurations and is not limited to a perpendicular configuration. The bend axis may extend along an arcuate line to provide the flange 54 with a lengthwise curvature; e.g. as can be seen in FIG. 4, a curvature that mates with the surface to which the strake 48 is to be attached. Once the first panel 56 is formed as described, the first panel 56 is cooled and the reinforced thermoplastic polymer laminate first panel retains the formed shape. The same process is performed for the second panel 58. Typically, the first and second panels 56, 58 are formed to create left and right hand versions but not necessarily. The first and second panels 56, 58 may be configured differently. In those instances wherein a carbon fiber reinforced thermoplastic laminate panel that includes a PEEK polymer is used to create the strake 48, heating the laminate to a temperature in the range of 700-730° F. for a period of time (e.g. 5-6 minutes) is typically adequate to create a bendable state. Once the flange 54 is formed in the respective panel 56, 58, cooling the laminate panel 56, 58 to a temperature at or below about 300° F. will allow the laminate panel 56, 58 to retain the formed shape.

The body 52 portions of the first and second panels 56, 58 are subsequently attached to one another (step 133 in FIG. 13); e.g. in a manner that the flange 54 portions of the first and second panels 56, 58 extend outwardly from the attached body 52 portions on opposite sides of the strake 48. A non-limiting example of a technique that can be used to attach the body 52 portions to one another includes a bonding process wherein the thermoplastic materials of the first and second panels bond and create a unitary body 52 portion for the strake 48; e.g., by chemical bonding, adhesive bonding, welding (via an induction process or a resistance process), etc. Alternative techniques for attaching the body 52 portions to one another include co-consolidating the portions, or mechanically fastening the portions, etc.

The first and second panels 56, 58 may be formed to specific geometries before or after being attached to one another (step 134 in FIG. 13); e.g., trimmed by a removing material via a waterjet, or automated cutter, or the like.

Figure 7:
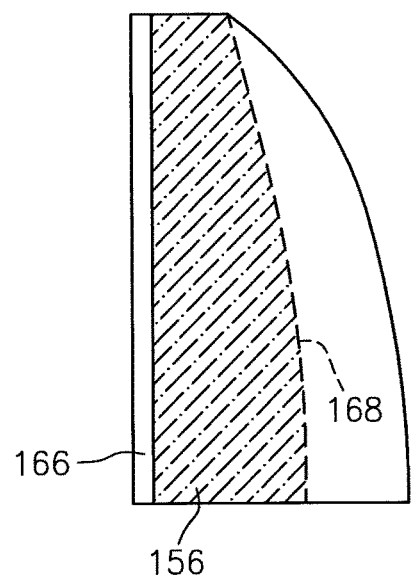
FIG. 7 is a diagrammatic planar view of a stack of strake components.
Figure 8:
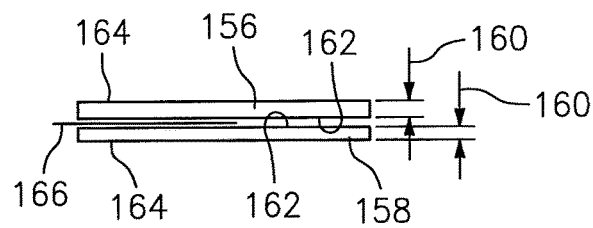
FIG. 8 is a diagrammatic end view of a stack of strake components.
Figure 9:
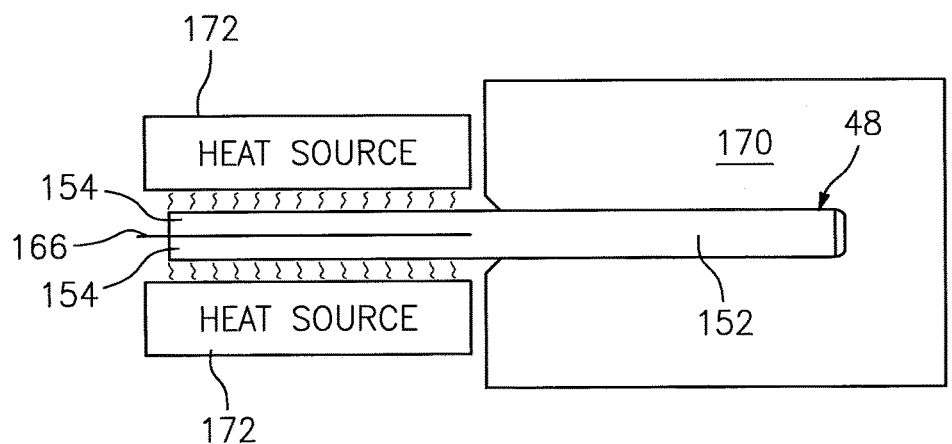
FIG. 9 is a diagrammatic view of a stack of strake components disposed within a forming tool, with a portion of the strake exposed to heat sources.
Figure 10:
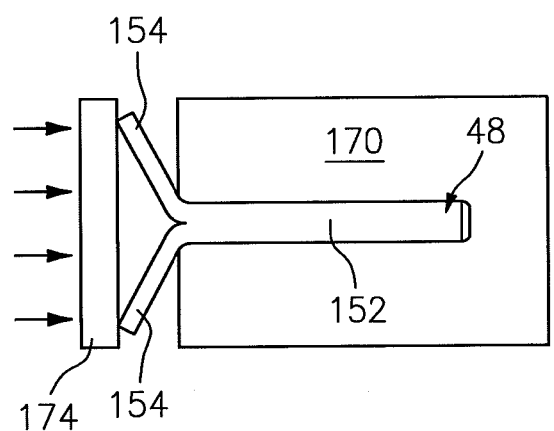
FIG. 10 is a diagrammatic illustration of a strake being formed with a first forming tool and a second forming tool.
Figure 11:
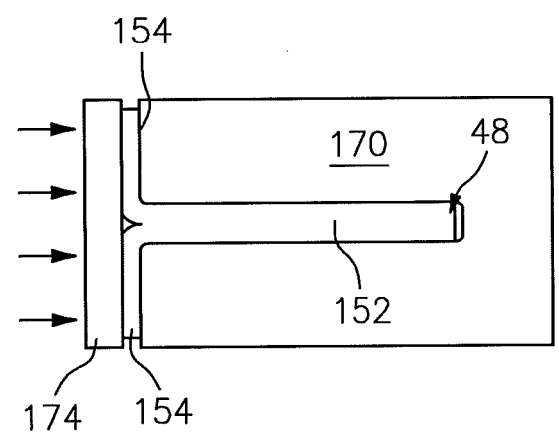
FIG. 11 is a diagrammatic illustration of a strake being formed with the forming tools shown in FIG. 10.
Figure 12:
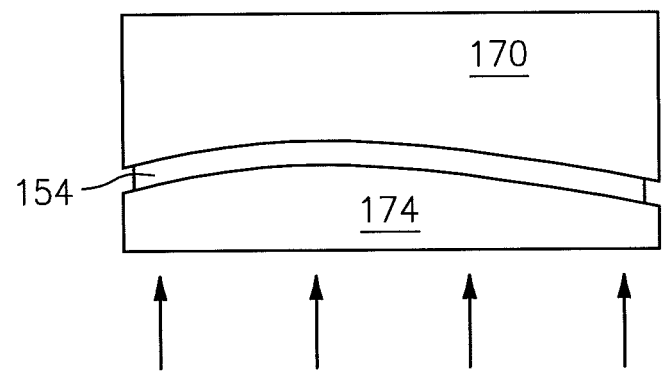
FIG. 12 is a diagrammatic illustration of a strake being formed with the forming tools shown in FIG. 10.
Figure 14:
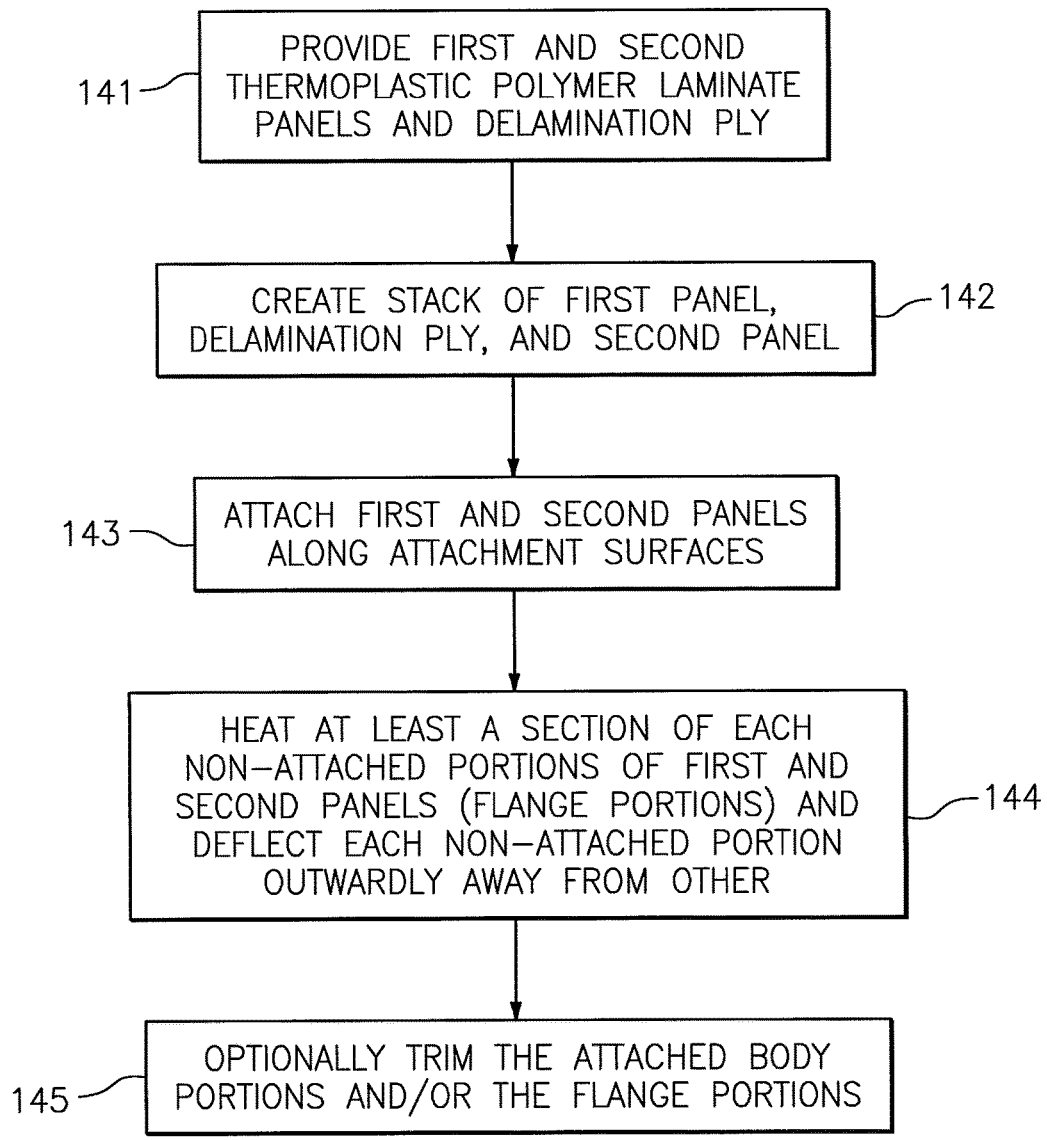
FIG. 14 is a flow chart of a strake manufacturing embodiment according to the present disclosure.

Now referring to FIGS. 7-12 and 14, according to another aspect of the present disclosure the method for manufacturing a strake 48 includes providing a first reinforced thermoplastic polymer laminate panel ("first panel 156") and a second reinforced thermoplastic polymer panel ("second panel 158"; e.g. see step 141 in FIG. 14). The first panel 156 and second panel may each be described as having a thickness 160 that extends between an attachment surface 162 and an exterior surface 164. The first and second panels 156, 158 may be configured identically or made be configured differently from one another. The first panel 156 is stacked with the second panel 158 such that the attachment surfaces 162 face one another. A delamination ply 166 is disposed between at least a portion of the attachment surfaces 162 (step 142 in FIG. 14). FIG. 7 illustrates a phantom line 168 indicating an edge of the delamination ply 166, and the position of the delamination ply 166 is indicated by shading. The portions of the first and second panels 156, 158 separated by the delamination ply 166 will, as described below, be formed to create the flange 154 portions of the strake 48. The portions of the first and second panels 156, 158 in contact with one another (i.e. the attachment surfaces 162 in contact with one another not separated by the delamination ply 166) will, as described below, be formed to create the body 152 of the strake 48.

The stack of the first panel 156, delamination ply 166, and second panel 158 are subjected to a process adapted to attach (e.g. bond) the first panel 156 and second panel 158 together (step 143 in FIG. 14); e.g. the stack is subjected to and elevated temperature and pressure for a period of time adequate for the thermoplastic materials of the first and second panels 156, 158 to bond to one another along the attachment surfaces 162 contiguous with one another within the stack. In those instances where fiber reinforcement is included, the fibers may be laid up by hand or machine, ply by ply with the correct fiber orientation. Once the plies are all in place (including any intentional delamination plies), the whole laminate is heated and then pressure or vacuum is applied to remove air and ensure the plies are consolidated prior to cooling the laminate. The portions of the first and second panel attachment surfaces 162 separated from one another by the delamination ply 166 are prevented from bonding to one another by the delamination ply 166. The present disclosure is not limited to an elevated temperature and pressure bonding process, and may be attached to one another by alternative process; e.g. a bonding material that attaches the attachment surfaces to one another.

After the first and second panels 156, 158 are attached to one another (e.g. in the regions not separated by the delamination ply 166), the delamination ply 166 can be removed from between the first and second panels 156, 158. The first and second panels 156, 158 are subsequently formed in a manner such that the flange 154 portions (i.e. the portions that were separated by the delamination ply 166) are deflected relative to the body 152 (step 144 in FIG. 14); e.g., deflected outwardly from the body 152, away from one another. An exemplary process (see FIGS. 9-12) that may be used to perform the aforesaid formation includes disposing the now attached body portions of the first and second panels 156, 158 within a first forming tool 170, and disposing the portions of the first and second panels 156, 158 not attached to one another (i.e. the flange portions) outside of the first forming tool 170. At least a part of each flange 154 portion is subsequently heated to a temperature sufficient for the respective flange portion to be deflected; e.g., using one or more heat sources 172 such as an infra-red heater. As indicated above, in those instances wherein the strake 48 is made of carbon fiber reinforced thermoplastic laminate panels that includes a PEEK polymer, heating the laminate to a temperature in the range of 700-730° F. for a period of time (e.g. 5-6 minutes) is typically adequate to create a bendable state. A second forming tool 174 is then forced against the flange 154 portions, toward the first forming tool 170 (or vice versa). As a result, the flange 154 portions deflect outwardly, away from one another. During the flange portion deflection process, the first forming tool 170 may be configured to maintain the strake body 152 portion at a temperature below a temperature that would permit the body 152 portion to separate (e.g. delaminate) into a plurality of pieces; e.g., the first forming tool 170 may act as a heat sink, or may be cooled. The second forming tool 174 may be forced further until the flange 154 portions are disposed between and in contact with the first and second forming tools 170, 174. Subsequently, the flange 154 portions are allowed to cool and the reinforced thermoplastic polymer laminate materials assume a rigid configuration.

The strake 48 (e.g., the body 152 portion and flange 154 portions may be formed to specific geometries before or after the forming tool formation process (step 145 in FIG. 14); e.g., trimmed by a removing material (e.g. the body portion along the second phantom line, etc.) via a waterjet, or automated cutter, or the like.

The foregoing descriptions are exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of manufacture, comprising:
   providing a first thermoplastic laminate panel, having a thickness extending between an exterior surface and an attachment surface;
   providing a second thermoplastic laminate panel, having a thickness extending between an exterior surface and an attachment surface;
   attaching the first thermoplastic laminate panel to the second thermoplastic laminate panel such that at least a portion of the attachment surface of the first thermoplastic laminate panel is attached to the attachment surface of a portion of the second thermoplastic laminate panel, which attached portions form a body of a strake;
   forming a first flange from a portion of the first thermoplastic laminate panel;
   forming a second flange from a portion of the second thermoplastic laminate panel; and
   attaching the strake to an exterior surface of a nacelle.

2. The method of claim 1, wherein the first flange is formed prior to attaching the first thermoplastic laminate panel to the second thermoplastic laminate panel.

3. The method of claim 2, wherein forming the first flange includes heating a region of the first thermoplastic laminate panel to a first temperature at which the first thermoplastic laminate panel can be plastically deformed, bending the first thermoplastic laminate panel within the heated region, and subsequently cooling the region to a second temperature below the first temperature.

4. The method of claim 2, wherein the second flange is formed prior to attaching the first thermoplastic laminate panel to the second thermoplastic laminate panel.

5. The method of claim 4, wherein forming the second flange includes heating a region of the second thermoplastic laminate panel to a first temperature at which the second thermoplastic laminate panel can be plastically deformed, bending the second thermoplastic laminate panel within the heated region, and subsequently cooling the region to a second temperature below the first temperature.

6. The method of claim 1, wherein the attaching the first thermoplastic laminate panel to the second thermoplastic panel includes heating the first thermoplastic laminate panel and the second thermoplastic laminate panel to a predetermined temperature.

7. The method of claim 1, wherein at least one of the first thermoplastic laminate panel and the second thermoplastic laminate panel comprises a polyaryletherketone type thermoplastic polymer.

8. The method of claim 2, wherein at least one of the first thermoplastic laminate panel and the second thermoplastic laminate panel comprises a fiber reinforcement material.

9. The method of claim 1, further comprising disposing a delamination ply between a flange portion of the first thermoplastic laminate panel and a flange portion of the second thermoplastic laminate panel prior to attaching the first thermoplastic laminate panel and the second thermoplastic laminate panel together.

10. The method of claim 9, wherein the delamination ply resides between the flange portions of the first thermoplastic laminate panel and the second thermoplastic laminate panel during attachment of the first thermoplastic laminate panel and the second thermoplastic laminate panel.

11. The method of claim 9, wherein the attaching the first thermoplastic laminate panel to the second thermoplastic panel includes heating the first thermoplastic laminate panel and the second thermoplastic laminate panel to a predetermined temperature.

12. The method of claim 9, further comprises disposing the body of the strake within a first forming tool, heating a region of the flange portion of the first thermoplastic laminate panel to a first temperature at which the first thermoplastic laminate panel can be plastically deformed, bending the first thermoplastic laminate panel within the heated region, and subsequently cooling the region to a second temperature below the first temperature.

13. The method of claim 12, wherein at least one of the first forming tool and a second forming tool is moved toward the other forming tool to cause the bending of the first thermoplastic laminate panel within the heated region.

14. The method of claim 12, further comprises heating a region of the flange portion of the second thermoplastic laminate panel to the first temperature, bending the second thermoplastic laminate panel within the heated region, and subsequently cooling the region to the second temperature.

15. The method of claim 12, wherein at least one of the first forming tool and a second forming tool is moved toward the other forming tool to cause the bending of the second thermoplastic laminate panel within the heated region.

16. The method of claim 1, wherein the body of the strake extends longitudinally between a first end and a second end, the body of the strake has a vertical height that extends out from the first flange to a distal edge, and the vertical height increases as the body extends longitudinally from the first end towards the second end.

* * * * *